(12) United States Patent
Davidson et al.

(10) Patent No.: US 7,689,594 B2
(45) Date of Patent: Mar. 30, 2010

(54) VEHICLE MANAGEMENT AND MISSION MANAGEMENT COMPUTER ARCHITECTURE AND PACKAGING

(75) Inventors: Ronald W. Davidson, St. Paul, MO (US); Kevin A. Wise, St. Charles, MO (US)

(73) Assignee: The Boeing Company, Irvine, CA (US)

( * ) Notice: Subject to any disclaimer, the term of this patent is extended or adjusted under 35 U.S.C. 154(b) by 586 days.

(21) Appl. No.: 11/534,461

(22) Filed: Sep. 22, 2006

(65) Prior Publication Data

US 2008/0077616 A1 Mar. 27, 2008

(51) Int. Cl.
*G06F 17/00* (2006.01)

(52) U.S. Cl. .............................. 707/104.1; 707/1; 701/1; 701/29; 701/34; 701/36; 701/41; 701/42; 701/43

(58) Field of Classification Search .............. 707/104.1; 701/1, 29, 34, 36, 41–43
See application file for complete search history.

(56) References Cited

U.S. PATENT DOCUMENTS

| | | | | |
|---|---|---|---|---|
| 6,208,923 B1 * | 3/2001 | Hommel | ...................... | 701/42 |
| 6,640,167 B1 * | 10/2003 | Carroll et al. | .................. | 701/34 |
| 6,958,709 B2 * | 10/2005 | Izbicki et al. | ................ | 340/994 |
| 6,985,803 B2 * | 1/2006 | Abdel-Malek et al. | ......... | 701/33 |
| 7,092,803 B2 * | 8/2006 | Kapolka et al. | ................ | 701/29 |
| 7,317,974 B2 * | 1/2008 | Luskin et al. | .................. | 701/29 |
| 7,477,968 B1 * | 1/2009 | Lowrey et al. | ................. | 701/29 |

* cited by examiner

*Primary Examiner*—Yicun Wu
(74) *Attorney, Agent, or Firm*—Charles L. Moore; Moore & Van Allen, PLLC

(57) ABSTRACT

A vehicle management and mission management computer architecture and packaging may include a first line replaceable unit and a second line replaceable unit. The first line replaceable unit may include a vehicle management system computer channel coupleable to a group including at least one mission related system and at least one vehicle system. The first line replaceable unit may also include a mission management system computer channel coupleable to the group including the at least one mission related system and the at least one vehicle system. The second line replaceable unit may include another vehicle management system computer channel coupleable to the group including the at least one mission related system and the at least one vehicle system. The second line replaceable unit may also include another mission management system computer channel coupleable to the group including the at least one mission related system and the at least one vehicle system.

17 Claims, 4 Drawing Sheets

VEHICLE MANAGEMENT AND MISSION MANAGEMENT COMPUTER ARCHITECTURE AND PACKAGING

BACKGROUND OF THE INVENTION

The present invention relates to computer architecture and packaging and more particularly to a vehicle management and mission management computer architecture and packaging for unmanned vehicles or the like.

Vehicles, such as unmanned vehicles or the like, typically have systems related to the operation of the vehicle and systems related to the mission of the vehicle. Examples of vehicle related systems may include vehicle propulsion systems, fuel systems, electrical systems, hydraulic systems, flight termination systems and the like. Examples of mission related systems may include communications systems, intelligence, surveillance and reconnaissance (ISR) systems, weapons systems and the like. Each of these systems may be controlled by management system computers or the like. In some applications, particularly those that may require high altitude and long endurance, low weight and reliable vehicle management system (VMS) and mission management system (MMS) computing are needed to meet the long endurance and high mission reliability goals.

BRIEF SUMMARY OF THE INVENTION

In accordance with an embodiment of the present invention, a vehicle management and mission management computer architecture and packaging may include a first line replaceable unit and a second line replaceable unit. The first line replaceable unit may include a vehicle management system computer channel coupleable to a group including at least one mission related system and at least one vehicle system. The first line replaceable unit may also include a mission management system computer channel coupleable to the group including the at least one mission related system and the at least one vehicle system. The second line replaceable unit may include another vehicle management system computer channel coupleable to the group including the at least one mission related system and at least one vehicle system, and the second line replaceable unit may also include another mission management system computer channel coupleable to the group including the at least one mission related system and the at least one vehicle system.

In accordance with another embodiment of the present invention, a vehicle management and mission management computer architecture and packaging may include a first line replaceable unit and a second line replaceable unit. A pair of vehicle management system computer channels may be included in each line replaceable unit, and a pair of mission management system computer channels may also be included in each line replaceable unit.

In accordance with another embodiment of the present invention, a vehicle may include at least one vehicle system and at least one mission related system. The vehicle may also include a vehicle management and mission management computer architecture and packaging. The vehicle management and mission management computer architecture and packaging may include a first line replaceable unit and a second line replaceable unit. The first line replaceable unit may include a vehicle management system computer channel coupled to the at least one mission related system and the at least one vehicle system. The first line replaceable unit may also include a mission management system computer channel coupled to the at least one mission related system and the at least one vehicle system. The second line replaceable unit may include another vehicle management system computer channel coupled to the at least one mission related system and the at least one vehicle system. The second line replaceable unit may also include another mission management system computer channel coupled to the at least one mission related system and the at least one vehicle system.

In accordance with another embodiment of the present invention, a method to provide vehicle management and mission management in a low weight and reliable architecture may include providing a first line replaceable unit and a second line replaceable unit. The method may also include providing at least one vehicle management system computer channel in each line replaceable unit; and at least one mission management system computer channel in each line replaceable unit.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1A:
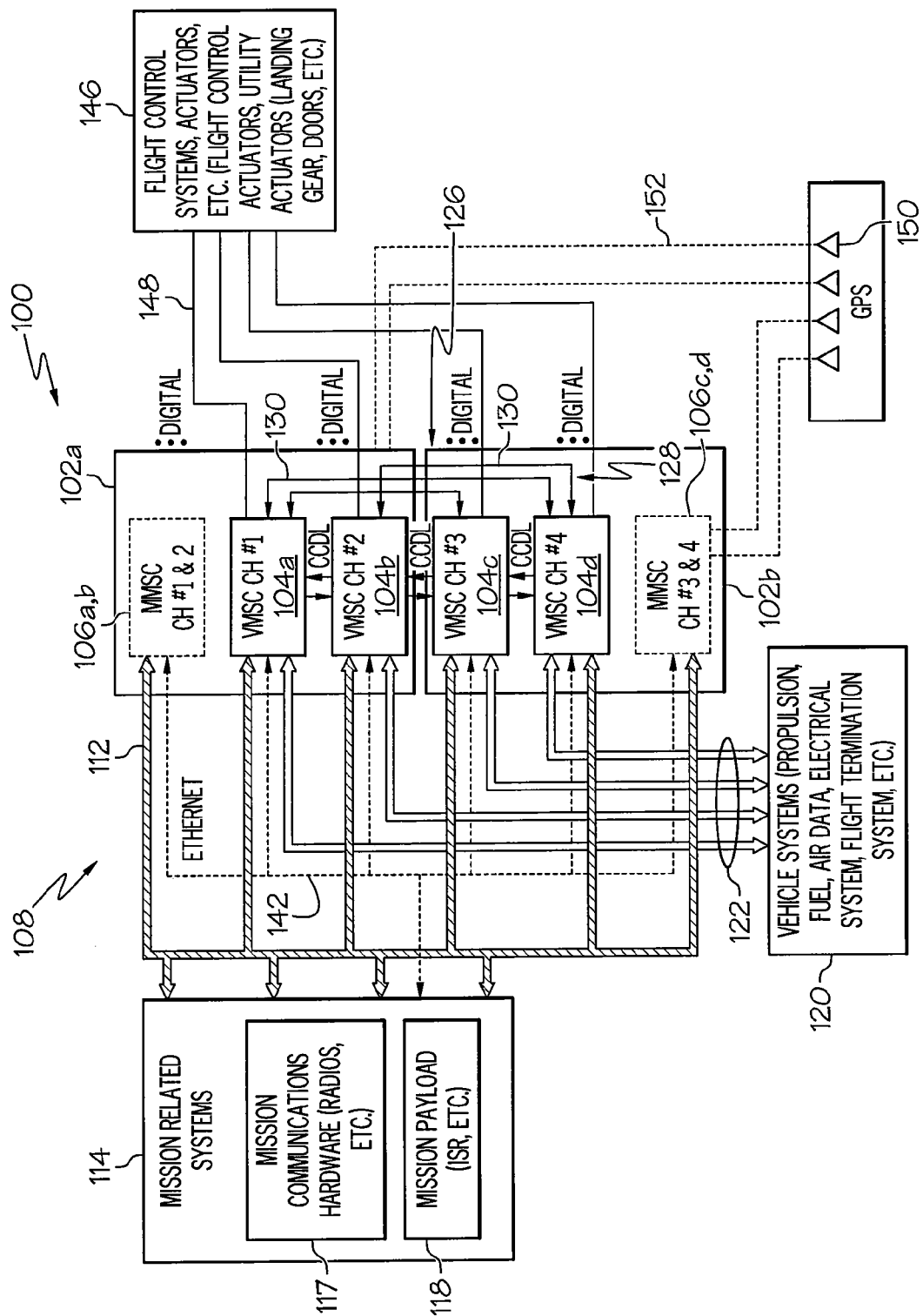
FIGS. 1A and 1B (collectively FIG. 1) are a block diagram of an example of a vehicle management system computer and mission management system computer architecture and packaging in accordance with an embodiment of the present invention.
Figure 1B:
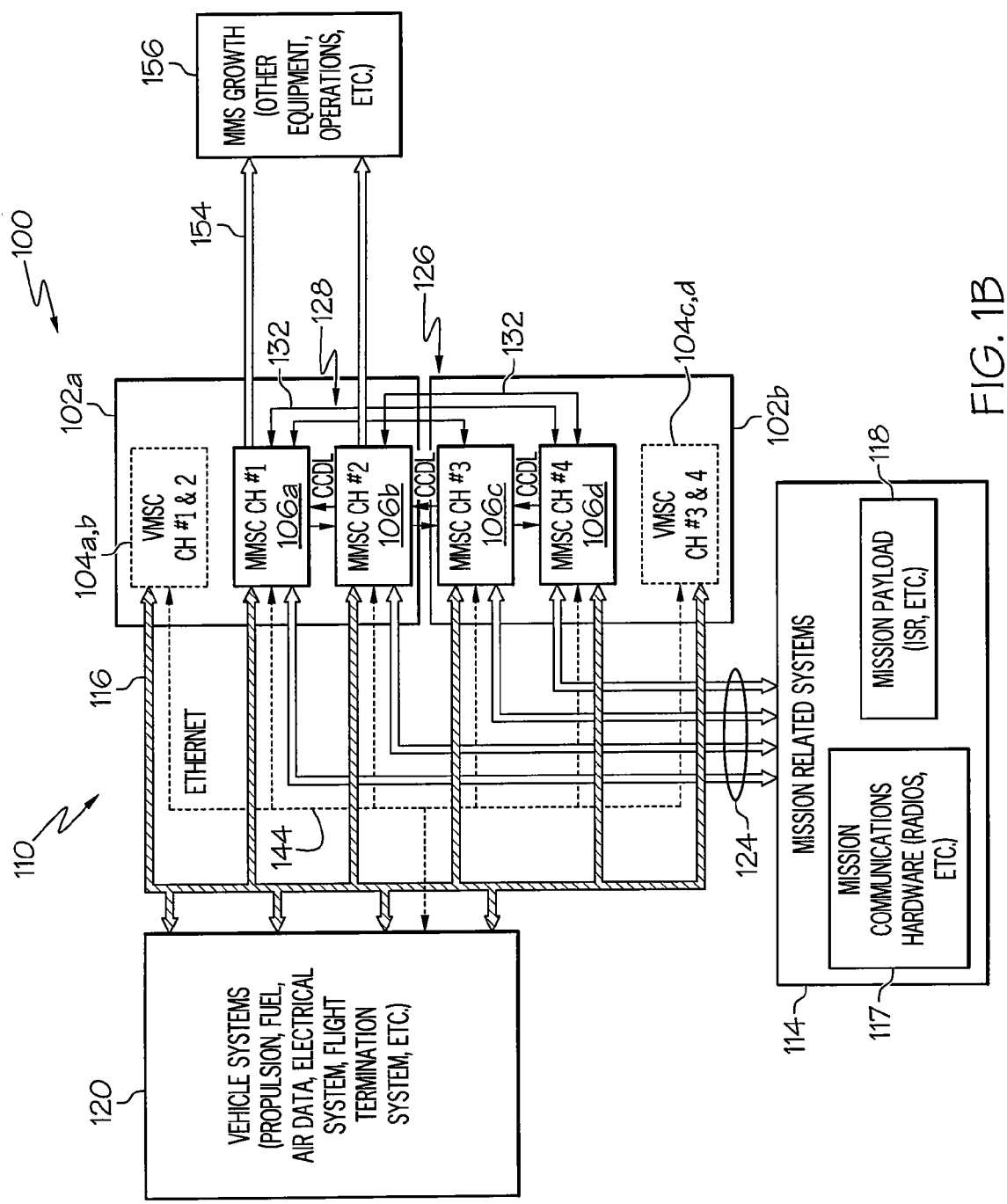

FIGS. 1A and 1B (collectively FIG. 1) are a block diagram of an example of a vehicle management system computer (VMSC) and mission management system computer (MMSC) architecture and packaging 100 in accordance with an embodiment of the present invention. The VMSC and MMSC architecture and packaging 100 may include a first line replaceable unit 102a and a second line replaceable unit 102b. Each line replaceable unit 102 may include two VMSCs or VMSC channels 104 and two MMSCs or MMSC channels 106. In the embodiment illustrated in FIGS. 1A and 1B, the first line replaceable unit 102a may include VMSC Channel #1 104a, VMSC channel #2 104b, MMSC Channel #1 106a (FIG. 1B) and MMSC Channel #2 106b (FIG. 1B). The second line replaceable unit 102b may include VMSC Channel #3 104c, VMSC Channel #4 104d, MMSC Channel #3 106c (FIG. 1B) and MMSC Channel #4 106d (FIG. 1B). The line replaceable units 102a and 102b may be identical.

FIGS. 1A and 1B each illustrate examples of the same line replaceable units 102a and 102b. For purposes of clarity and explanation, FIG. 1A illustrates the VMSC channels 104 and an associated VMSC bus architecture 108, and FIG. 1B illustrates the MMSC channels 106 and an associated MMSC bus architecture 110. The MMSC channels 106 are illustrated in phantom or broken lines in FIG. 1A. Similarly, the VMSC channels 104 are illustrated in phantom or broken lines in FIG. 1B.

The vehicle management and mission management computer architecture and packaging 100 may include a VMSC common bus 112 (FIG. 1A) coupling together the VMSC channels 104 and the MMSC channels 106. The VMSC common bus 112 may be further adapted to couple the channels 104 and 106 to one or more mission related systems 114. Mission related systems 114 may include mission communications hardware 117 or equipment and mission payload 118 or other equipment or systems needed to perform a particular mission or purpose. Examples of mission communications hardware 117 may include radios or other communications devices. Examples of mission payload 118 may include intelligence, surveillance and reconnaissance (ISR) equipment or systems, weapons systems, or other systems to perform a predefined mission.

The vehicle management and mission management computer architecture and packaging 100 may also include a MMSC common bus 116 (FIG. 1B) to couple together the MMSC channels 106 and the VMSC channels 104. The VMSC common bus 112 and the MMSC common bus 116 may be a single common bus. The MMSC common bus 116 may be further adapted to couple the channels 104 and 106 to one or more vehicle systems 120. Vehicle systems 120 may be those systems necessary to operate the vehicle to perform the predefined mission. Examples of vehicle systems 120 may include propulsion systems, fuel systems, air data, electrical systems, flight termination systems and other systems needed for operation of the vehicle.

The VMSC bus architecture 108 (FIG. 1A) may also include a separate group of VMSC buses 122. Each separate VMSC bus 122 may couple a respective one of the VMSC channels 104 to one or more vehicle systems 120.

Similarly, the MMSC bus architecture 110 (FIG. 1B) may include a separate group of MMSC buses 124. Each separate MMSC bus 124 may couple a respective one of the MMSC channels 106 to one or more mission related systems 114.

The VMSC and MMSC architecture and packaging 100 may also include a channel restart feature 126. A cross channel data link architecture 128 may be provided to exchange data between channels and to support redundancy management voting and the channel restart feature 126 or capability. A channel restart capability may be provided in the event that a VMSC channel 104 or a MMSC channel 106 becomes corrupted during operation. A possible cause of corruption may be a single event upset (SEU) where a gamma ray corrupts a memory component within a channel. To accomplish channel restart, the effected channel must reboot and its states must be reinitialized from correctly operating channels using the cross channel data links 128.

In accordance with one embodiment of the present invention illustrated in FIGS. 1A and 1B, the cross channel data link architecture 128 may include a plurality of cross channel data links 130, at least one between each VMSC channel 104 in the first and second LRUs 102 and another plurality of cross channel data links 132, at least one between each MMSC channel 106 in the first and second LRUs 102.

The VMSC and MMSC architecture and packaging 100 may also include a VMSC Ethernet 142 (FIG. 1A) to couple the VMSC channels 104 and the MMSC channels 106 and may further couple the channels to one or more mission related systems 114.

Similarly, the VMSC and MMSC architecture and packaging 100 may include a MMSC Ethernet 144 (FIG. 1B) to couple the VMSC channels 104 and MMSC channels 106 and may further couple the channels to at least one vehicle system 120. The VMSC Ethernet 142 and MMSC Ethernet 144 may be a single system.

The VMSC channels 104 may also be coupled to one or more actuators 146, flight control systems or similar apparatus associated with a vehicle where the VMSC/MMSC architecture and packaging 100 may be deployed. The VMSC channels 104 may be coupled to the actuator or actuators by suitable links and/or connectors 148. The actuators 146 may be flight control actuators to control flight control surfaces, utility actuators, such as landing gear, doors or components. The links 148 may be digital links or connections.

As will be described in more detail with reference to FIG. 2, each of the VMSC channels 104 may include a global positioning system (GPS) receiver. Accordingly, each of the VMSC channels 104 may be coupled to a GPS antenna 150 by a suitable connection 152.

The VMSC and MMSC architecture and packaging 100 may further include a bus 154 associated with each MMSC Channel 106 for MMS growth 156. Examples of the MMS growth 156 may include other mission related equipment or operations.

Figure 2:
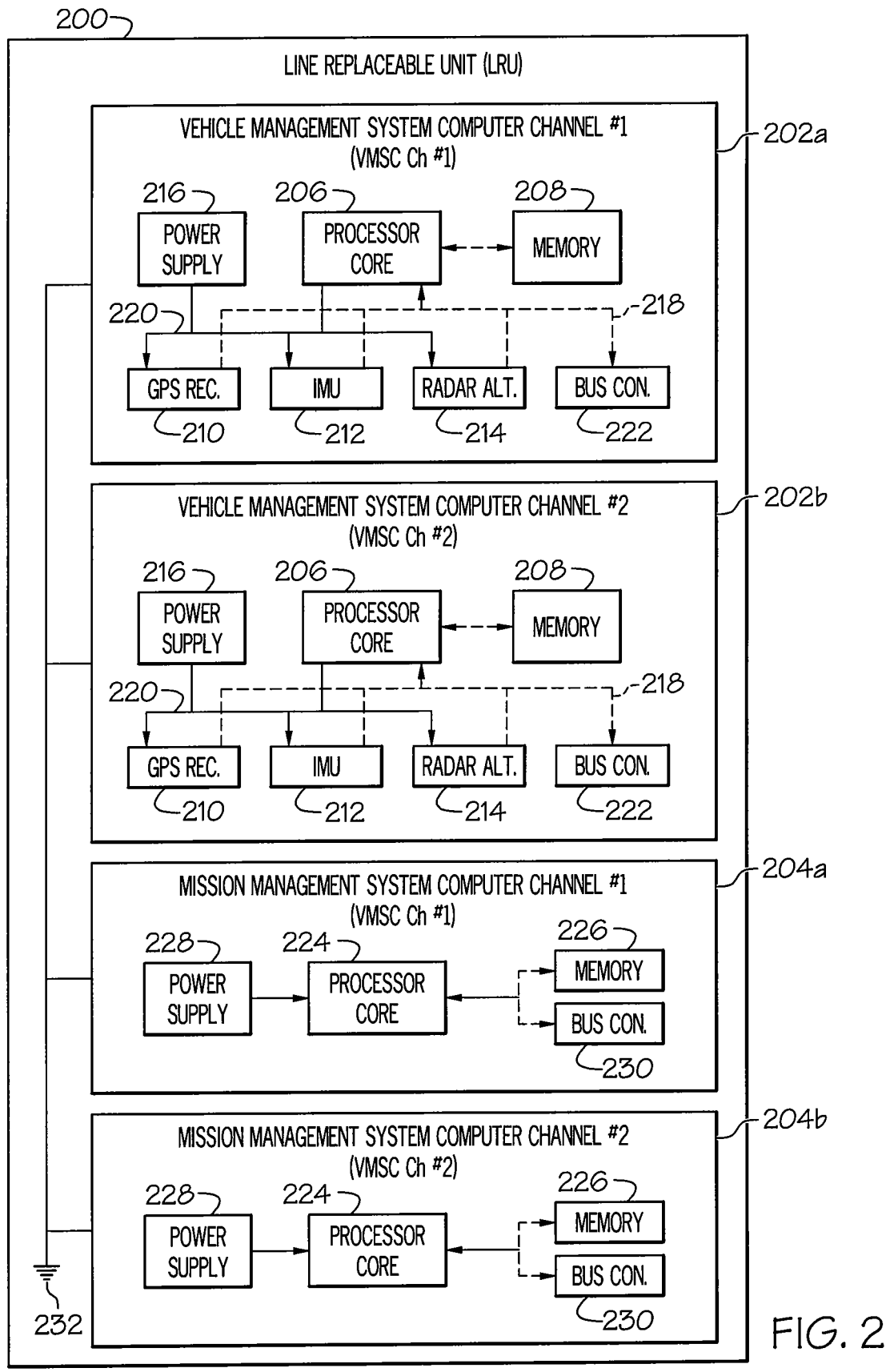
FIG. 2 is a block diagram of an example of a line replaceable unit (LRU) in accordance with an embodiment of the present invention.

FIG. 2 is a block diagram of an example of a line replaceable unit (LRU) 200 in accordance with an embodiment of the present invention. The LRU 200 may be used for each of the line replaceable units 102a and 102b in FIGS. 1A and 1B. The LRU 200 may include a pair of vehicle management system computer (VMSC) channels 202a and 202b and a pair of mission management system computer (MMSC) channels 204a and 204b. The primary function of the VMSC channels 202 may be to monitor and command or control vehicle subsystems as may be required for autonomous operation or other operation. For example, in unmanned aerospace vehicles, the VMSC channels 202 may monitor and control vehicle subsystems to autonomously operate the vehicle during ground operations (i.e. takeoff and landing) and airborne or flight operations (i.e. fly a particular course or route, fly at particular altitudes, etc.). The MMSC channels 204 may monitor and command or control communications systems, ISR systems, aerial spraying systems, weapons systems or other mission related systems as needed to achieve mission goals.

Each VMSC channel 202 may include a processor 206 or processor core to control overall operation of the VMSC channel 202 and the other components. The processor 206 may access a memory 208 or storage device for storing programs or applications that may operate or run on the processor 206 for particular vehicle operations. Each VMSC channel 202 may also include a global positioning system (GPS) receiver 210 and an inertial measurement unit (IMU) 212. The GPS receiver 210 may be used to determine a geographic location of the vehicle on which the LRU 200 is operating and to assist with guidance or navigation of the vehicle. The IMU 212 may provide measurements of vehicle movement, such as vehicle rotation rates, linear accelerations and the like for flight controls and navigation algorithms. The IMU 212 may be a Honeywell HG1700 as manufactured by Honeywell, Minneapolis, Minn., or a similar device. For airborne applications, each VMSC channel 202 may also include a radar altimeter to provide altitude measurements for control and guidance of the vehicle.

The VMSC channel 202 may also include a power supply 216 to power the various components of the VMSC channel 202 that may require power. Data connections 218 between the different components of the VMSC channel are illustrated by a dashed or broken line in FIG. 2 and power distribution lines 220 are illustrated by solid lines in FIG. 2. The VMSC channel 202 may also include one or more bus connections or connectors 222 to couple the VMSC channel 202 to various vehicle systems and mission related systems, such as vehicle systems 120 and mission related systems 114, similar to that described with respect to FIGS. 1A and 1B.

Each MMSC channel 204 may include a processor 224 or processor core and a memory 226 that may store programs or applications operable on the processor 224 as well as other data. The processor 224 and memory 226 may be the same as processor 206 and memory 208 of the VMSC channels 202. A power supply 228 may also be included to provide power for operation of the processor 224 and any other components of the MMSC channel 204 that may require power. The MMSC channel 204 may also include bus connectors 230 or connections to couple the MMSC channel 204 to the various mission related systems and vehicle systems similar to the architectures described in FIGS. 1A and 1B.

The computing channels 202 and 204 may be electrically independent, particularly between LRUs to protect the system from potential faults that could take down or render inoperative all computing channels in a given LRU. However, all channels 202 and 204 within an LRU 200 may share a common ground 232.

Figure 3:
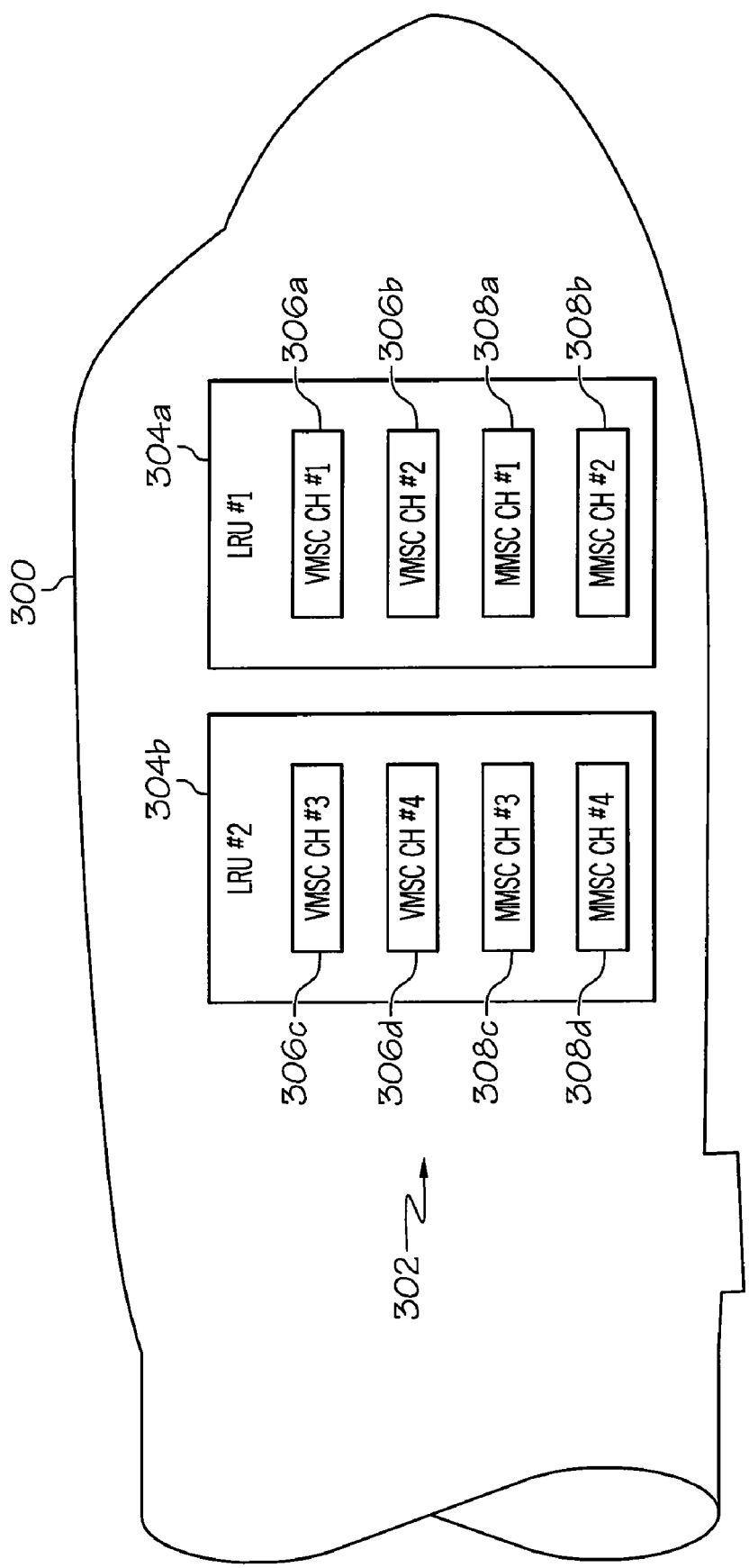
FIG. 3 is an illustration of an example of a vehicle including a vehicle management computer system and mission management computer system architecture and packaging in accordance with an embodiment of the present invention.

FIG. 3 is an illustration of an example of a vehicle 300 including a multiple redundant system 302 or vehicle management computer system and mission management computer system architecture and packaging in accordance with an embodiment of the present invention. The vehicle 300 illustrated in FIG. 3 may be an aerospace vehicle, such as an unmanned aircraft or the like, but the present invention may also be applicable to water craft and terrestrial vehicles which may be manned or unmanned. The vehicle management and mission management computer architecture and packaging 300 may provide quad redundant VMS and MMS computing using two line replaceable units (LRUs) 304a and 304b. The LRUs 304 may be similar to the LRU 200 described with reference to FIG. 2 and the VMS and MMS computer architecture and packaging 302 may be similar to that described with reference to FIGS. 1A and 1B.

The two LRUs 304a and 304b may be identical and may each include two VMS computing channels 306 and two MMS computing channels 308. Placing multiple computing channels 306 and 308 in each LRU 304 reduces weight of the overall package 302. Separating the quad redundant VMS 306 and MMS 308 computing into 2 channels per LRU 304 protects the system from potential faults that could take down or render inoperative all computing channels in a given LRU 304. Even though multiple channels 306 and 308 are included in a given LRU 304, all computing channels 306 and 308 may be electrically independent with the exception of channels within a given LRU 304 sharing a common ground plane, similar to that described with reference to FIG. 2.

The VMS 306 and MMS 308 computing channels may use common processor and memory hardware elements similar to FIG. 2. The primary difference between VMS and MMS hardware may be that the VMSC channels 306 may include unique sensors or components. As previously described with reference to FIG. 2, the VMS 306 unique sensors or components may include an inertial measurement unit (quad) (212 in FIG. 2), global positioning system receiver (quad) (210 in FIG. 2), and radar altimeter (dual) (214 in FIG. 2). Similar to that described with respect to FIGS. 1A and 1B, the VMS channels 306 and the MMS channels 308 may include cross channel data links that exchange data between channels to support redundancy management voting and channel restart capability.

Desirable characteristics of the present invention include light weight and high reliability providing benefit to long endurance applications. Since long endurance is important to unmanned aircraft applications, the present invention has applicability to such technology.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A vehicle management and mission management computer architecture and packaging mountable in a vehicle, comprising:
   a first line replaceable unit including:
      a vehicle management system computer (VMSC) channel coupleable to a group including at least one mission related system and at least one vehicle system;
      a mission management system computer (MMSC) channel coupleable to the group including the at least one mission related system and the at least one vehicle system;
   a second line replaceable unit including:
      another VMSC channel coupleable to the group including the at least one mission related system and the at least one vehicle system; and
      another MMSC channel coupleable to the group including the at least one mission related system and the at least one vehicle system; and
   a VMSC common bus coupling together at least the VMSC channel and the other VMSC channel, and adapted to couple at least the vehicle management system computer channels to each mission related system;

a separate VMSC bus to couple each VMSC channel and each vehicle system;

a MMSC common bus coupling together at least the MMSC channel and the other MMSC channel, and adapted to couple at least the mission management system computer channels to each vehicle system; and a separate MMSC bus to couple each mission management system computer channel and each mission related system.

2. The vehicle management and mission management computer architecture and packaging of claim 1, further comprising a channel restart feature.

3. The vehicle management and mission management computer architecture and packaging of claim 1, further comprising a cross channel data link architecture to exchange data between channels and to support redundancy management voting and channel restart capability.

4. The vehicle management and mission management computer architecture and packaging of claim 3, wherein the cross channel data link architecture comprises a cross channel data link to couple the vehicle management system computer channel in the first line replaceable unit to the other vehicle management system computer channel in the second line replaceable unit.

5. The vehicle management and mission management computer architecture and packaging of claim 3, wherein the cross channel data link architecture comprises a cross channel data link to couple the mission management system computer channel in the first line replaceable unit to the other mission management system computer channel in the second line replaceable unit.

6. The vehicle management and mission management computer architecture and packaging of claim 1, further comprising an Ethernet to couple the channels, the at least one mission related system and the at least one vehicle system.

7. The vehicle management and mission management computer architecture and packaging of claim 1, wherein the vehicle management system computer channels are couplable to a plurality of actuators.

8. The vehicle management and mission management computer architecture and packaging of claim 1, wherein the channels are electrically independent.

9. The vehicle management and mission management computer architecture and packaging of claim 8, wherein channels within the same line replaceable unit share a common ground.

10. The vehicle management and mission management computer architecture and packaging of claim 1, further comprising a fault protection feature to prevent all channels in a line replaceable unit from going down.

11. The vehicle management and mission management computer architecture and packaging of claim 10, wherein the fault protection feature comprises a quad redundant vehicle management system computing architecture and a mission management system computing architecture separated into two channels each per line replaceable unit.

12. The vehicle management and mission management computer architecture and packaging of claim 1, wherein the vehicle management system computer channel comprises:

a processor to control operation of the vehicle management system computer channel;

a memory accessible by the processor;

a global positioning system receiver to provide global positioning information relative to a vehicle;

an inertial measurement unit to provide measurements of vehicle movement; and a radar altimeter to determine an altitude of the vehicle; and a bus controller to control coupling of the vehicle management system computer channel to a bus.

13. The vehicle management and mission management computer architecture and packaging of claim 1, wherein the mission management system computer channel comprises:

a processor to control operation of the mission management system computer channel;

a memory accessible by the processor; and a bus controller to control coupling of the mission management system computer channel to a bus.

14. A vehicle, comprising:

at least one vehicle system;

at least one mission related system;

a vehicle management and mission management computer architecture and packaging mounted in the vehicle, wherein the vehicle management and mission management computer architecture and packaging include:

a first line replaceable unit including:

a vehicle management system computer (VMSC) channel coupled to the at least one mission related system and the at least one vehicle system;

a mission management system computer (MMSC) channel coupled to the at least one mission related system and the at least one vehicle system;

a second line replaceable unit including:

another VMSC channel coupled to the at least one mission related system and the at least one vehicle system; and another MMSC channel coupled to the at least one mission related system and the at least one vehicle system; and a VMSC common bus coupling together at least the VMSC channel and the other VMSC channel, and adapted to couple at least the vehicle management system computer channels to each mission related system;

a separate VMSC bus to couple each VMSC channel and each vehicle system;

a MMSC common bus coupling together at least the MMSC channel and the other MMSC channel, and adapted to couple at least the mission management system computer channels to each vehicle system; and a separate MMSC bus to couple each mission management system computer channel and each mission related system.

15. The vehicle of claim 14, wherein the vehicle management and mission management computer architecture further comprise a channel restart feature.

16. The vehicle of claim 14, wherein the vehicle management and mission management computer architecture further comprise a fault protection feature to prevent all channels in a line replaceable unit from going down.

17. The vehicle of claim 14, wherein the vehicle comprises one of an aerospace vehicle, a water craft, and a terrestrial vehicle.

\* \* \* \* \*